United States Patent [19]

Geitner

[11] Patent Number: 5,346,710
[45] Date of Patent: Sep. 13, 1994

[54] ANIMAL FEEDING SYSTEM AND METHOD THEREFOR

[75] Inventor: Linda Geitner, Encinitas, Calif.

[73] Assignee: Contagious Concepts, Encinitas, Calif.

[21] Appl. No.: 70,047

[22] Filed: Jun. 1, 1993

Related U.S. Application Data

[63] Continuation of Ser. No. 542,176, Jun. 22, 1990, abandoned.

[51] Int. Cl.⁵ .................. B65D 21/00; B65D 43/03; B65D 81/00
[52] U.S. Cl. .................. 426/115; 426/124; 426/120; 426/87; 426/805; 426/383; 426/104; 426/138; 426/396; 119/61; 119/51.5; 220/23.83
[58] Field of Search ............ 426/104, 115, 138, 120, 426/396, 805, 87, 383, 124; 119/61

[56] References Cited

U.S. PATENT DOCUMENTS

| | | | |
|---|---|---|---|
| D. 241,184 | 8/1976 | French | 426/104 |
| 982,711 | 1/1911 | Ellis | 426/104 |
| 1,018,415 | 2/1912 | Ellis | 426/104 |
| 1,149,170 | 8/1915 | Allis | 426/104 |
| 1,514,379 | 11/1924 | Fleischer | 426/115 |
| 1,695,567 | 12/1928 | Weber | 426/104 |
| 1,715,857 | 6/1929 | Meyer | 426/138 |
| 1,815,527 | 7/1931 | Scruggs | 426/138 |
| 2,096,825 | 10/1937 | Roman | 426/115 |
| 2,401,038 | 5/1946 | Barton et al. | 426/115 |
| 2,739,751 | 3/1956 | Bailey | 426/120 |
| 2,965,496 | 12/1960 | Serdar | 426/120 |
| 3,107,651 | 10/1963 | Beck | 426/104 |
| 3,179,320 | 4/1965 | Ward | 426/115 |
| 3,240,610 | 3/1966 | Cease | 426/120 |
| 3,445,050 | 5/1969 | Peters et al. | 426/115 |
| 3,568,875 | 3/1971 | Olan | 119/61 |
| 3,778,515 | 12/1973 | Ashley | 426/112 |
| 3,892,867 | 7/1975 | Schoonman | 426/415 |
| 4,085,706 | 4/1978 | Evans | 119/61 |
| 4,203,516 | 5/1980 | Stonoga et al. | 426/104 |
| 4,270,490 | 6/1981 | Kopp | 119/61 |
| 4,328,254 | 5/1982 | Waldburger | 426/120 |
| 4,348,421 | 9/1982 | Sakakibara | 426/120 |
| 4,525,367 | 6/1985 | Allison | 426/396 |
| 4,656,042 | 4/1987 | Risler | 426/396 |
| 4,660,716 | 4/1987 | McMahon | 206/541 |
| 4,716,855 | 1/1988 | Andersson et al. | 119/61 |
| 4,880,112 | 11/1989 | Conrad | 119/61 |

FOREIGN PATENT DOCUMENTS

| | | | |
|---|---|---|---|
| 0172587 | 2/1986 | European Pat. Off. | 426/115 |
| WO8801248 | 2/1988 | PCT Int'l Appl. | 426/104 |

Primary Examiner—Steven Weinstein
Attorney, Agent, or Firm—Burns, Doane, Swecker & Mathis

[57] ABSTRACT

An animal feeding system includes a self-supporting bowl made from edible material having a bottom, a top and a side providing in combination a container for holding animal food, the bowl being of selected size and configuration to contain a desired quantity of food depending on animal size and dietary requirements. There is further provided an animal feeding system and related method wherein an edible bowl is provided in combination with a water bowl to provide a self-contained meal package for an animal.

13 Claims, 1 Drawing Sheet

U.S. Patent     Sep. 13, 1994     5,346,710
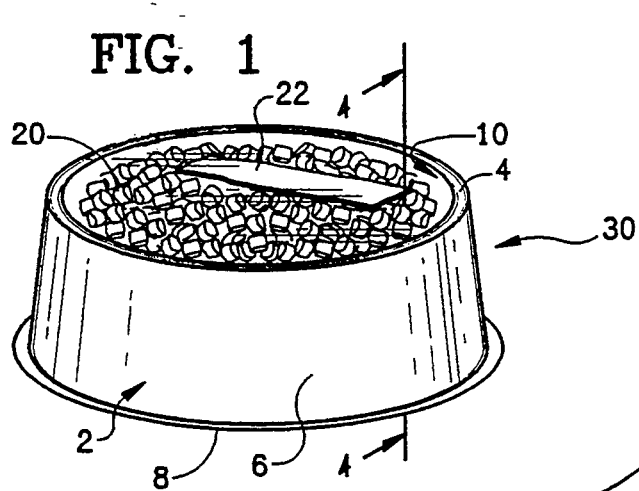
FIG. 1
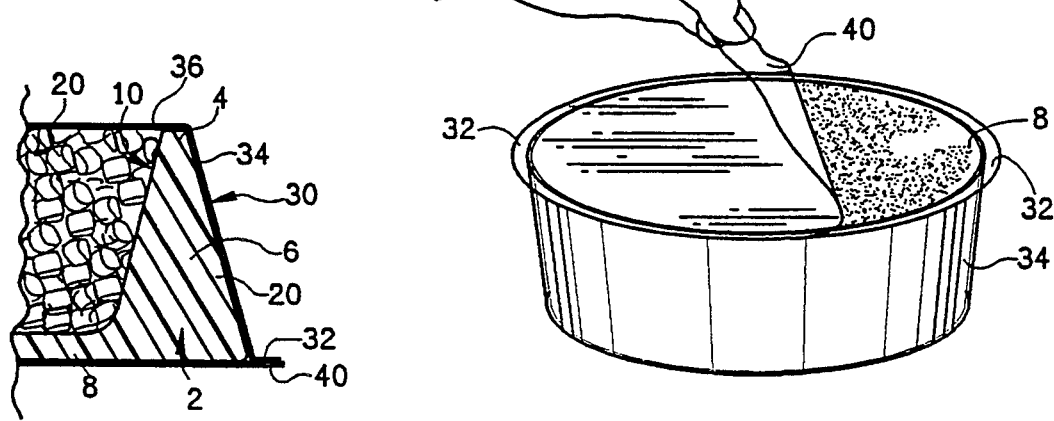
FIG. 2
FIG. 4
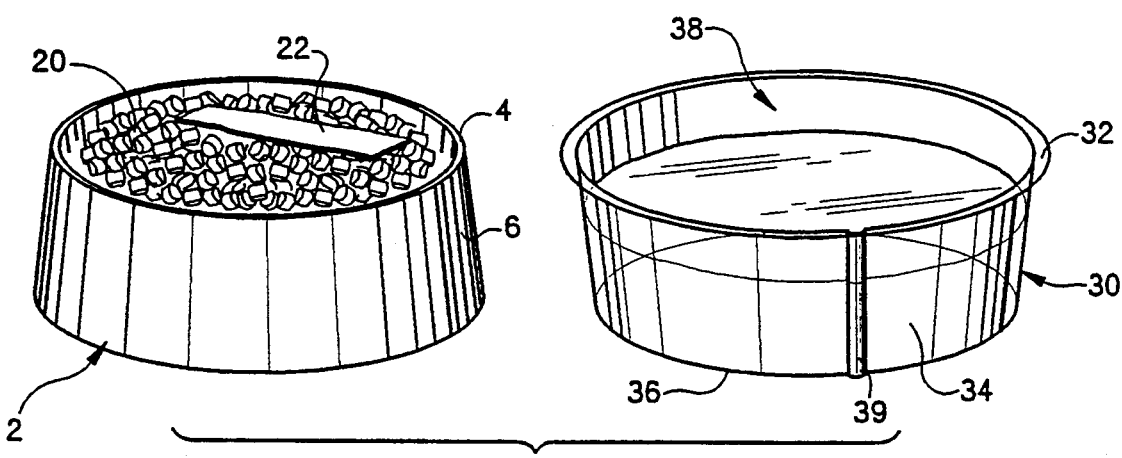
FIG. 3

ANIMAL FEEDING SYSTEM AND METHOD THEREFOR

This application is a continuation, of application Ser. No. 07/542,176, filed Jun. 22, 1990, now abandoned.

BACKGROUND OF THE INVENTION

The field of the present invention is animal foods and feeding apparatus, and more particularly, foods and containers for feeding and watering domestic animals such as dogs, cats, and the like.

Providing for the nutritional needs of a domestic animal such as a dog or cat typically requires that the animal lover purchase a serving container for the animal's food and a separate serving container for the animal's water. Moreover, the animal is typically provided various foods and food supplements including bulk feed material such as canned, semi-moist or dry food, and special treats or supplements such as biscuits and other tartar control foods and/or chew materials such as flavored rawhide and the like. A multiplicity of purchases must usually be regularly made to maintain these supplies.

By the time these supplies are procured, the pet fancier will have accumulated a plethora of food and beverage serving containers and various food packages which can take up significant amounts of storage space. Each time the animal is fed, the pet owner must select the appropriate foods and measure out the appropriate amounts thereof in accordance with the animal's size and dietary requirements. Following feeding time, the packages in which the food was purchased must be disposed of or re-stored and the food and beverage serving containers must be cleaned, dried and put away until the next feeding.

Accordingly, there is an evident need for an animal feeding system which minimizes food and food container storage requirements, and the time spent in food preparation and cleanup. Moreover, it would be desirable to simplify food purchasing by minimizing the various products which must be separately purchased at various intervals when the food supply runs out.

SUMMARY OF THE INVENTION

The present invention is directed to an animal feeding system and method for providing a prepackaged animal meal adapted to achieve the foregoing objects and goals. To that end, there is provided a food storage container made from edible material which the animal may consume at each feeding. The feeding container may be prepackaged with a selected quantity of food contained therein. Moreover, additional water container means may be packaged therewith for providing a disposable water container in conjunction with the meal provided by the edible container and the food contained therein.

BRIEF DESCRIPTION OF THE DRAWING

The objects, advantages and features of this invention will be more clearly perceived from the following detailed description when read in accordance with the accompanying drawing in which:

FIG. 1 is an external diagrammatic projected illustration of an animal feeding apparatus constructed in accordance with the present invention;

FIG. 2 is a diagrammatic projected illustration of the bottom portion of the animal feeding apparatus shown in FIG. 1 showing removal of a seal member therefrom;

FIG. 3 is a diagrammatic projected illustration of the animal feeding apparatus of FIGS. 1 and 2 showing the apparatus set up for commencement of a meal; and FIG. 4 is a partially detailed cross-sectional view take-along line 4—4 of FIG. 1.

DETAILED DESCRIPTION OF THE PREFERRED EMBODIMENTS

Referring to FIG. 1 a self-supporting, edible food bowl 2 is preferably formed from a tartar control material such as found in conventional dog or cat biscuits, which are formed from a baked-hardened biscuit substance having selected tooth polishing properties. The edible bowl 2 includes a generally annular top rim 4, a side 6, and a bottom 8. The rim 4, side 6, and bottom 8 of the bowl 2 form in combination a bowl interior 10 adapted to contain an appropriate animal food substance 20. The food substance 20 may be conventional dry dog or cat food or may be a semi-moist food such as those currently on the market. The food substance 20 could also be any other suitable conventional pet food substance. All or a portion of the food 20 could be separately packaged in an easily operable container shaped to occupy the interior 10. Also disposed in the bowl interior 10 may be an appropriate chew material 22 such as flavored rawhide or the like.

Turning to FIG. 2, the bowl 2 is nested within a water bowl 30 made from a conventional packaging material such as biodegradable plastic. As shown in FIGS. 2 and 3, the water bowl 30 includes an annular top rim 32, side 34 and a bottom 36 forming in combination a water holding interior 38 for containing an appropriate animal beverage. For structural rigidity, the water bowl 30 could be provided with ribbed support members 39 on the side thereof as shown by example in FIG. 3. Referring further to FIG. 4, the water bowl 30 and the edible food bowl 2 are nested in a top to bottom relationship wherein the top of the water bowl rests proximate the bottom of the edible food bowl, the bottom of the water bowl covers the top of the edible food bowl and the side of the water bowl covers the side of the edible food bowl. Alternatively, the food and water bowls could be sized and configured for arrangement in a top to top relationship.

Referring now to FIG. 2, the nested food and water bowl package is completed with a peelable cover seal member 40 which is attached to the top of the water bowl 30 and covers same to seal the contents of the water bowl from outside air. Preferably, like the water bowl 30, the cover 40 is made from a suitable packaging material such as biodegradable plastic. The water bowl 30 and the cover 40 are preferably transparent. Moreover, the edible food bowl may be color coded to identify the type or flavor of the food contained therein.

In accordance with the above, an improved animal feeding system and method for providing a self contained prepackaged animal meal is provided. Rather than purchase a number of different food packages, measure out the desired quantity of food and clean the serving containers after the pet finishes eating, the pet lover is able to purchase prepackaged meals which contain their own food and beverage containers. Preferably, the edible food bowl is sized and configured to contain a desired quantity of food depending on the animal's size, age, teeth strength and dietary requirements. Moreover, the bowl may have side and bottom thicknesses selected in proportion to the volumetric capacity of the bowl and quantity of food contained therein to provide a selected ratio of contained food and edible bowl material in accordance with animal dietary requirements. For example, assuming a generally cylindrical food bowl having a disk-shaped bottom of thickness "t," an interior radius "$r_1$," an exterior radius "$r_2$," and an interior height "h," the volumetric ratio "R" of the food bowl material to the volume of contained food is given by the expression, $R = r_2^2/r_1^2(1+t/h) - 1$. For a container in which $t=0.5$," $r_1=3$," $r_2=4$, and $h=4$, the volumetric ratio is $R=1:1$. Other volumetric ratios may be preferred.

It is understood that the foregoing description and accompanying illustrations are merely exemplary and are no way intended to limit the scope of the invention, which is defined solely by the appended claims and their equivalents. Various changes and modifications to the preferred embodiments should be apparent to those skilled in the art. Such changes and modifications can be made without departing from the spirit and scope of the invention. Accordingly, it is intended that all such changes and modifications be covered by the appended claims and equivalents.

What is claimed is:

1. A pre-packaged non-human animal feeding system for feeding non-human animals, comprising:
   a self-supporting food bowl made from an edible material for non-human animal consumption, said bowl having a closed bottom, a side and a top rim located opposite said bottom, said closed bottom, side and top rim defining a bowl interior;
   a quantity of non-human animal food contained within the bowl interior, said non-human animal food being specifically selected for non-human animal consumption;
   a beverage bowl having a closed bottom, a top rim located opposite said closed bottom and a side extending between the top rim and the bottom, said top rim of the beverage bowl defining an open top of the beverage bowl, said food bowl containing said animal food being nested within the beverage bowl with the top rim of the beverage bowl located proximate the bottom of the food bowl, the bottom of the beverage bowl covering the top rim of the food bowl and the side of the beverage bowl covering the side of the food bowl so that the beverage bowl serves as a partial enclosure for both the food bowl and the animal food, said beverage bowl being separable from the food bowl to also serve as a receptacle for an animal beverage; and
   a removable cover attached to the top rim of the beverage bowl to close the open top of the beverage bowl and seal both the food bowl and the animal food from contact with outside air.

2. The animal feeding system of claim 1, including rib support members extending along the side of the beverage bowl for increasing rigidity.

3. The animal feeding system of claim 1, wherein said food bowl is made of a bake-hardened substance.

4. The animal feeding system of claim 1, wherein said food bowl is made of a dog food preparation.

5. The animal feeding system of claim 1, wherein said food bowl is made of a cat food preparation.

6. The animal feeding system of claim 1, wherein said quantity of animal food is a food substance having a particular flavor, and said food bowl includes means for identifying the particular flavor of the animal food contained in the edible food bowl, said means for identifying including said food bowl being color coded to the particular flavor of the animal food contained in the food bowl.

7. The animal feeding system of claim 1, wherein said beverage bowl and said cover are formed from transparent food packaging material.

8. The animal feeding system of claim 1, wherein said water bowl and water bowl cover are formed from biodegradable material.

9. The animal feeding system of claim 1, wherein said food bowl has side and bottom thicknesses selected in proportion to the volumetric capacity of said food bowl and the quantity of food contained therein to provide a selected ratio of contained animal food and edible material in accordance with animal size and dietary requirements.

10. The animal feeding system of claim 1, further including an animal chew material disposed in the bowl interior of the food bowl, said animal chew material being different from the non-human animal food.

11. A method of producing a pre-packaged animal meal for non-human animal consumption, comprising:
   providing a food bowl which is made from edible animal food material specifically selected for non-human animal consumption, said food bowl having a closed bottom, a side and a top rim located opposite said bottom, said top rim, closed bottom and side defining a bowl interior;
   placing animal food specifically selected for non-human animal consumption in the bowl interior of the edible food bowl;
   nesting said edible food bowl containing said animal food within a beverage bowl having a closed bottom, a top rim located opposite said closed bottom and a side extending between the top rim and the bottom, said top rim of the beverage bowl defining an open top of the beverage bowl, said food bowl being nested within the beverage bowl with the top rim of the beverage bowl located proximate the bottom of the food bowl, the bottom of the beverage bowl covering the top rim of the food bowl and the side of the beverage bowl covering the side of the food bowl, so that said beverage bowl serves as a partial enclosure for both the food bowl and the animal food when the food bowl is nested within the beverage bowl, said beverage bowl being separable from the food bowl so that the beverage bowl also serves as a receptacle for an animal beverage; and
   attaching a removable cover to the top rim of the beverage bowl to close the open top of the beverage bowl and seal both the food bowl and the animal food from contact with outside air, said cover being removable from the beverage bowl so that the beverage bowl is usable as a receptacle for receiving animal beverage once the beverage bowl has been separated from the food bowl.

12. The method according to claim 11, wherein said step of placing said animal food in the bowl interior of the edible food bowl includes placing animal food in the bowl interior wherein said animal food has a particular flavor, and including the step of identifying the particular flavor of the animal food in the bowl interior of the edible food bowl by forming the edible food bowl to have a color that is color coded to the particular flavor of the animal food in the bowl interior.

13. The method according to claim 11, including additionally placing an animal chew material in the bowl interior of the edible food bowl that is different from the animal food.

* * * * *